(12) United States Patent
Jozaki et al.

(10) Patent No.: US 8,712,649 B2
(45) Date of Patent: Apr. 29, 2014

(54) CONTINUOUSLY VARIABLE TRANSMISSION AND CONTROL METHOD THEREOF

(75) Inventors: Tateki Jozaki, Yokohama (JP); Hideaki Suzuki, Yokohama (JP); Ryousuke Nonomura, Kawasaki (JP); Mamiko Inoue, Machida (JP); Seiichiro Takahashi, Isehara (JP); Tatsuo Ochiai, Oiso-machi (JP); Masato Koga, Hiratsuka (JP); Masaaki Uchida, Yokosuka (JP); Ryoji Kadono, Kawasaki (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 927 days.

(21) Appl. No.: 12/727,506

(22) Filed: Mar. 19, 2010

(65) Prior Publication Data

US 2010/0248875 A1  Sep. 30, 2010

(30) Foreign Application Priority Data

Mar. 27, 2009  (JP) .................................. 2009-79677

(51) Int. Cl.
*F16H 59/00* (2006.01)
(52) U.S. Cl.
USPC ................... 701/51; 701/55; 701/56; 701/58; 477/37; 477/43; 477/46; 477/69; 475/208
(58) Field of Classification Search
USPC .......... 701/51, 55, 58, 56; 477/37, 41, 69, 43, 477/46, 98; 475/209, 41, 208, 48, 46
See application file for complete search history.

(56) References Cited

U.S. PATENT DOCUMENTS

| 4,672,863 A | 6/1987 | Itoh et al. |
| 4,674,359 A * | 6/1987 | Hattori ............................. 74/745 |
| 4,685,358 A | 8/1987 | Itoh |
| 4,793,217 A | 12/1988 | Morisawa et al. |
| 5,820,514 A | 10/1998 | Adachi |
| 6,216,073 B1 * | 4/2001 | Horiguchi et al. .............. 701/51 |
| 6,314,357 B1 | 11/2001 | Kon et al. |

(Continued)

FOREIGN PATENT DOCUMENTS

| DE | 199 41 009 A1 | 3/2001 |
| DE | 19941009 A1 * | 3/2001 .............. F16H 59/06 |

(Continued)

OTHER PUBLICATIONS

R. Nonmura, U.S. PTO Notice of Allowance, U.S. Appl. No. 12/828,604, dated Feb. 13, 2012, 17 pages.

(Continued)

*Primary Examiner* — Thomas Black
*Assistant Examiner* — Sara Lewandroski
(74) *Attorney, Agent, or Firm* — Foley & Lardner LLP

(57) ABSTRACT

A transmission controller permits a 2-1 shift, in which a gear position of a subtransmission mechanism is changed from a second speed to a first speed, when an accelerator pedal has been depressed to or above a predetermined opening. The gear position of the subtransmission mechanism is changed from the second speed to the first speed when an actual through speed ratio passes a mode switch line from a High side to a Low side while the 2-1 shift is permitted in the subtransmission mechanism.

8 Claims, 5 Drawing Sheets

(56) References Cited

U.S. PATENT DOCUMENTS

| | | | |
|---|---|---|---|
| 6,519,520 B2 * | 2/2003 | Shin .......................... | 701/55 |
| 6,821,228 B2 | 11/2004 | Aoki et al. | |
| 6,855,085 B1 | 2/2005 | Gumpoltsberger | |
| 6,932,739 B2 | 8/2005 | Miyata et al. | |
| 7,108,631 B2 | 9/2006 | Inoue et al. | |
| 7,393,306 B2 | 7/2008 | Tanaka | |
| 7,637,836 B2 | 12/2009 | Watanabe et al. | |
| 7,780,570 B2 * | 8/2010 | Iwatsuki et al. ........... | 477/78 |
| 7,833,126 B2 | 11/2010 | Venter | |
| 8,000,863 B2 * | 8/2011 | DeMarco et al. .......... | 701/51 |
| 8,055,414 B2 | 11/2011 | Tawara | |
| 8,086,379 B2 * | 12/2011 | Sugiura et al. ............ | 701/52 |
| 8,187,145 B2 * | 5/2012 | Kaminsky et al. ......... | 477/5 |
| 8,204,659 B2 * | 6/2012 | Kouno et al. .............. | 701/55 |
| 8,214,093 B2 * | 7/2012 | Heap et al. ................ | 701/22 |
| 8,321,097 B2 * | 11/2012 | Vasiliotis et al. ......... | 701/51 |
| 2002/0011792 A1 | 1/2002 | Taniguchi et al. | |
| 2005/0085340 A1 | 4/2005 | Ishikawa et al. | |
| 2006/0217230 A1 | 9/2006 | Tanaka | |
| 2007/0129922 A1 * | 6/2007 | Lee et al. ................... | 703/13 |
| 2009/0042690 A1 | 2/2009 | Tabata et al. | |
| 2009/0105041 A1 | 4/2009 | McKenzie et al. | |
| 2010/0248895 A1 | 9/2010 | Jozaki et al. | |
| 2011/0015033 A1 | 1/2011 | Nonomura et al. | |

FOREIGN PATENT DOCUMENTS

| | | |
|---|---|---|
| DE | 199 50 053 A1 | 4/2001 |
| JP | 60-037455 A | 2/1985 |
| JP | 62-181928 A | 8/1987 |
| JP | 63-125446 A | 5/1988 |
| JP | 04-307165 A | 10/1992 |
| JP | 05-079554 A | 3/1993 |
| JP | 8-178043 A | 7/1996 |
| JP | 11-51162 A | 2/1999 |
| JP | 11-108175 A | 4/1999 |
| JP | 2002-106700 A | 4/2002 |
| JP | 2006-112536 A | 4/2006 |
| JP | 2006-266320 A | 10/2006 |
| JP | 2007-092665 A | 4/2007 |
| JP | 2007-118727 A | 5/2007 |

OTHER PUBLICATIONS

T. Jozaki, U.S. PTO Office Action, U.S. Appl. No. 12/727,516, dated Jan. 20, 2012, 10 pages.

U.S. Appl. No. 12/828,604, filed Jul. 1, 2010, Nonomura.

T. Jozaki, U.S. PTO Notice of Allowance, U.S. Appl. No. 12/727,516, dated Apr. 26, 2012, 6 pages.

T. Jozaki, U.S. PTO Office Action, U.S. Appl. No. 12/727,500, dated Apr. 30, 2012, 12 pages.

R. Nonomura, U.S. PTO Notice of Allowance, U.S. Appl. No. 12/828,604, dated Jun. 7, 2012, 12 pages.

U.S. Appl. No. 12/727,497, filed Mar. 19, 2010, Jozaki et al.

U.S. Appl. No. 12/727,500, filed Mar. 19, 2010, Jozaki et al.

U.S. Appl. No. 12/727,516, filed Mar. 19, 2010, Jozaki et al.

T. Jozaki, U.S. PTO Notice of Allowance, U.S. Appl. No. 12/727,497, dated Aug. 1, 2012, 16 pages.

T. Jozaki, U.S. PTO Notice of Allowance, U.S. Appl. No. 12/727,500, dated Jul. 11, 2012, 12 pages.

T. Jozaki, U.S. PTO Notice of Allowance, U.S. Appl. No. 13/618,516, dated Nov. 30, 2012, 9 pages.

* cited by examiner

CONTINUOUSLY VARIABLE TRANSMISSION AND CONTROL METHOD THEREOF

TECHNICAL FIELD OF THE INVENTION

This invention relates to a continuously variable transmission and a control method thereof, and more particularly to a continuously variable transmission comprising a belt continuously variable speed change mechanism and a subtransmission mechanism.

BACKGROUND OF THE INVENTION

JP60-37455A discloses a continuously variable transmission in which a two-forward speed subtransmission mechanism is provided in series with a belt continuously variable speed change mechanism (to be referred to hereafter as a "variator"), and a gear position of the subtransmission mechanism is changed in accordance with an operating condition of a vehicle. Thus, an achievable speed ratio range is enlarged without increasing the size of the variator.

SUMMARY OF THE INVENTION

In this type of continuously variable transmission including a subtransmission mechanism, a shift may be performed in the subtransmission mechanism when an overall speed ratio (to be referred to hereafter as a "through speed ratio") of the continuously variable transmission passes a specific through speed ratio. For example, by shifting the subtransmission mechanism when the speed ratio of the variator reaches a Highest speed ratio in a construction where the subtransmission mechanism is connected to an output side of the variator, torque input into the subtransmission mechanism during the shift decreases, enabling a reduction in shift shock.

However, with a construction in which a shift is performed in the subtransmission mechanism when the through speed ratio passes a specific through speed ratio, shifts may be performed in the subtransmission mechanism frequently while the through speed ratio varies in the vicinity of the specific through speed ratio, and as a result, shift shock may occur repeatedly, leading to a reduction in drivability and a reduction in the durability of frictional engagement elements constituting the subtransmission mechanism.

It is therefore an object of this invention to prevent repeated shifts in a subtransmission mechanism by optimizing a shift condition of the subtransmission mechanism.

According to an aspect of the present invention, a continuously variable transmission installed in a vehicle, which shifts an output rotation of a power source and transmits the shifted rotation to drive wheels, includes a belt continuously variable speed change mechanism (to be referred to hereafter as a "variator") capable of varying a speed ratio continuously, a subtransmission mechanism provided in series with the variator and having a first gear position and a second gear position, the second gear position having a smaller speed ratio than the first gear position, as forward gear positions, a destination through speed ratio setting unit which sets, on the basis of an operating condition of the vehicle, an overall speed ratio (to be referred to hereafter as a "through speed ratio") of the variator and the subtransmission mechanism to be realized in accordance with the operating condition as a destination through speed ratio, a shift control unit which controls at least one of the speed ratio of the variator and the gear position of the subtransmission mechanism such that an actual value of the through speed ratio (to be referred to hereafter as an "actual through speed ratio") becomes the destination through speed ratio, and a subtransmission mechanism 2-1 shift permitting unit which permits a 2-1 shift, in which the gear position of the subtransmission mechanism is changed from the second gear position to the first gear position, when an accelerator pedal of the power source is depressed to or above a predetermined opening, the predetermined opening being an opening where the destination through ratio is on a Low side of a high speed mode Lowest line which is a shift line when the gear position of the subtransmission mechanism is the second gear and the speed ratio of the variator is a Lowest speed ratio. The shift control unit changes the gear position of the subtransmission mechanism from the first gear position to the second gear position when the actual through speed ratio passes a predetermined mode switch line from a Low side to a High side, the predetermined mode switch line is set on a High side of the high speed mode Lowest line, and changes the gear position of the subtransmission mechanism from the second gear position to the first gear position when the actual through speed ratio passes the mode switch line from the High side to the Low side while the 2-1 shift is permitted in the subtransmission mechanism.

According to another aspect of the present invention, a control method for a continuously variable transmission that is installed in a vehicle so as to shift an output rotation of a power source and transmit the shifted rotation to drive wheels, including a belt continuously variable speed change mechanism (to be referred to hereafter as a "variator") capable of varying a speed ratio continuously, and a subtransmission mechanism provided in series with the variator and having a first gear position and a second gear position, the second gear position having a smaller speed ratio than the first gear position, as forward gear positions, is provided. The method includes a destination through speed ratio setting step for setting, on the basis of an operating condition of the vehicle, an overall speed ratio (to be referred to hereafter as a "through speed ratio") of the variator and the subtransmission mechanism to be realized in accordance with the operating condition as a destination through speed ratio, a shift control step for controlling at least one of the speed ratio of the variator and the gear position of the subtransmission mechanism such that an actual value of the through speed ratio (to be referred to hereafter as an "actual through speed ratio") becomes the destination through speed ratio, and a subtransmission mechanism 2-1 shift permitting step for permitting a 2-1 shift, in which the gear position of the subtransmission mechanism is changed from the second gear position to the first gear position, when an accelerator pedal of the power source is depressed to or above a predetermined opening, the predetermined opening being an opening where the destination through ratio is on a Low side of a high speed mode Lowest line which is a shift line when the gear position of the subtransmission mechanism is the second gear and the speed ratio of the variator is a Lowest speed ratio. In the shift control step, the gear position of the subtransmission mechanism is changed from the first gear position to the second gear position when the actual through speed ratio passes a predetermined mode switch line from a Low side to a High side, the predetermined mode switch line is set on a High side of the high speed mode Lowest line, and the gear position of the subtransmission mechanism is changed from the second gear position to the first gear position when the actual through speed ratio passes the mode switch speed ratio from the High side to the Low side while the 2-1 shift is permitted in the subtransmission mechanism.

Embodiments and advantages of this invention will be described in detail below with reference to the attached figures.

DESCRIPTION OF THE PREFERRED EMBODIMENTS

An embodiment of this invention will be described below with reference to the attached figures. It should be noted that in the following description, a "speed ratio" of a certain speed change mechanism is a value obtained by dividing an input rotation speed of the speed change mechanism by an output rotation speed of the speed change mechanism. Further, a "Lowest speed ratio" is a maximum speed ratio of the speed change mechanism and a "Highest speed ratio" is a minimum speed ratio of the speed change mechanism.

Figure 1:
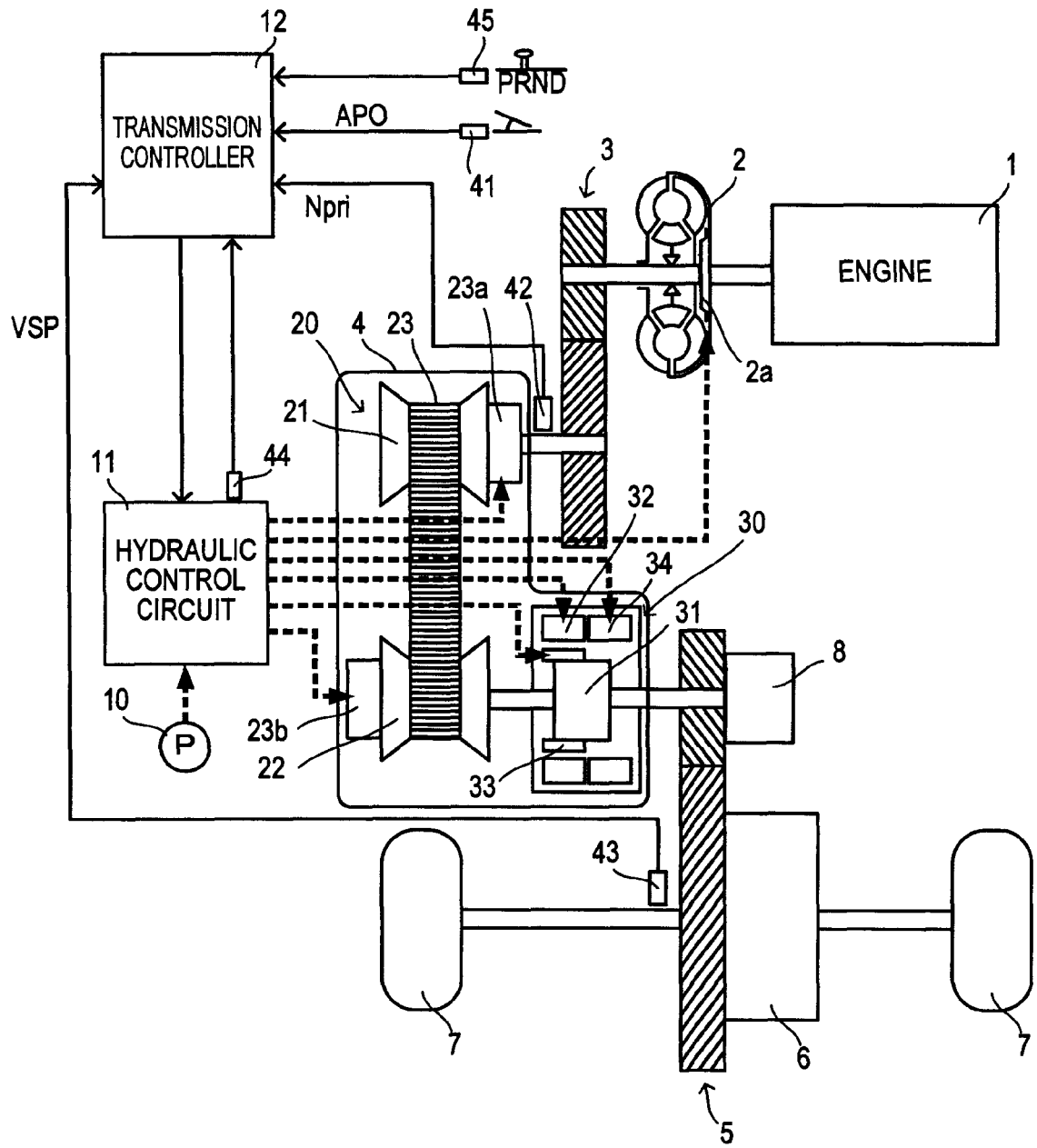
FIG. 1 is a schematic diagram showing a vehicle installed with a continuously variable transmission according to an embodiment of this invention.

FIG. 1 is a schematic diagram showing a vehicle installed with a continuously variable transmission according to an embodiment of this invention. The vehicle includes an engine 1 as a power source. An output rotation of the engine 1 is transmitted to drive wheels 7 via a torque converter 2, a first gear train 3, a continuously variable transmission (to be referred to simply as a "transmission 4" hereafter), a second gear train 5, and a final reduction gear 6. The second gear train 5 is provided with a parking mechanism 8 which locks an output shaft of the transmission 4 mechanically during parking so that the output shaft of the transmission 4 cannot rotate.

The torque converter 2 includes a lockup clutch 2a. When the lockup clutch 2a is engaged, slippage in the torque converter 2 is eliminated, leading to an improvement in a transmission efficiency of the torque converter 2.

Further, the vehicle is provided with an oil pump 10 that is driven using a part of the power of the engine 1, a hydraulic control circuit 11 that regulates an oil pressure from the oil pump 10 and supplies the regulated oil pressure to respective sites of the transmission 4, and a transmission controller 12 that controls the hydraulic control circuit 11.

The transmission 4 includes a belt continuously variable speed change mechanism (to be referred to hereafter as a "variator") 20, and a subtransmission mechanism 30 provided in series with the variator 20. Here, "provided in series" means that the variator 20 and the subtransmission mechanism 30 are provided in series on a power transmission path extending from the engine 1 to the drive wheels 7. The subtransmission mechanism 30 may be connected to an output shaft of the variator 20 directly, as in this example, or via another speed change/power transmission mechanism (a gear train, for example). Alternatively, the subtransmission mechanism 30 may be connected to a front stage (an input shaft side) of the variator 20.

The variator 20 includes a primary pulley 21, a secondary pulley 22, and a V belt 23 wrapped around the pulleys 21, 22. The pulleys 21, 22 respectively include a fixed conical plate, a movable conical plate disposed relative to the fixed conical plate such that respective sheave surfaces thereof oppose each other, thereby forming a V groove, and hydraulic cylinders 23a, 23b provided on a back surface of the movable conical plate so as to displace the movable conical plate in an axial direction. When oil pressure supplied to the hydraulic cylinders 23a, 23b is regulated, a width of the V groove varies, causing a contact radius between the V belt 23 and the respective pulleys 21, 22 to vary, and as a result, the speed ratio of the variator 20 is varied continuously.

The subtransmission mechanism 30 is a speed change mechanism having two-forward speed and single-reverse speed. The subtransmission mechanism 30 includes a Ravigneaux planetary gear mechanism 31 in which carriers of two planetary gears are coupled, and a plurality of frictional engagement elements (a Low brake 32, a High clutch 33, and a Rev brake 34) which are connected to a plurality of rotary elements constituting the Ravigneaux planetary gear mechanism 31 so as to modify rotation states thereof. When engagement/disengagement states of the respective frictional engagement elements 32 to 34 are modified by regulating oil pressures supplied to the respective frictional engagement elements 32 to 34, the gear position of the subtransmission mechanism 30 is changed.

For example, when the Low brake 32 is engaged and the High clutch 33 and Rev brake 34 are disengaged, the gear position of the subtransmission mechanism 30 becomes a first speed. When the High clutch 33 is engaged and the Low brake 32 and Rev brake 34 are disengaged, the gear position of the subtransmission mechanism 30 becomes a second speed in which the speed ratio is smaller than that of the first speed. Further, when the Rev brake 34 is engaged and the Low brake 32 and High clutch 33 are disengaged, the gear position of the subtransmission mechanism 30 becomes the reverse speed. In the following description, the terms "the transmission 4 is in a low speed mode" and "the transmission 4 is in a high speed mode" will be used to indicate that the gear position of the subtransmission mechanism 30 corresponds to the first speed and the second speed, respectively.

Figure 2:
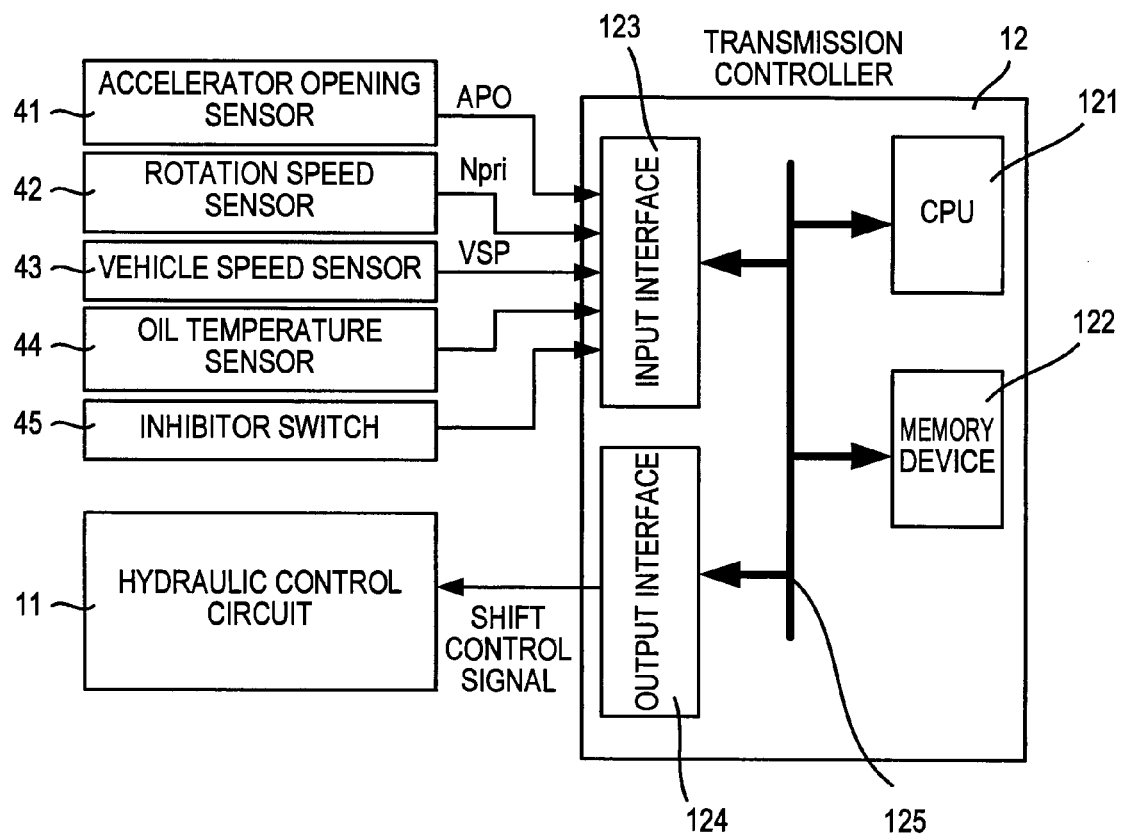
FIG. 2 is a view showing an internal constitution of a transmission controller.

As shown in FIG. 2, the transmission controller 12 is constituted by a CPU 121, a memory device 122 including a RAM and a ROM, an input interface 123, an output interface 124, and a bus 125 that connects these components to each other.

An output signal from an accelerator opening sensor 41 that detects an accelerator opening APO, which is an operating amount of an accelerator pedal, an output signal from a rotation speed sensor 42 that detects an input rotation speed of the transmission 4 (=a rotation speed of the primary pulley 21; to be referred to hereafter as a "primary rotation speed Npri"), an output signal from a vehicle speed sensor 43 that detects a vehicle speed VSP, an output signal from an oil temperature sensor 44 that detects an oil temperature TMP of the transmission 4, an output signal from an inhibitor switch 45 that detects a position of a select lever, and so on are input into the input interface 123.

The memory device 122 stores a shift control program (FIG. 4) of the transmission 4, and a shift map (FIG. 3) used by the shift control program. The CPU 121 reads and executes the shift control program stored in the memory device 122, generates a shift control signal by implementing various types of calculation processing on the various signals input via the input interface 123, and outputs the generated shift control signal to the hydraulic control circuit 11 via the output interface 124. Various values used during the calculation processing executed by the CPU 121 and results of the calculation processing are stored in the memory device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, regulate the oil pressure generated by the oil pump 10 to a required oil pressure, and supply the regulated oil pressure to the respective sites of the transmission 4. Thus, the shift of the variator 20, the change of the gear position of the subtransmission mechanism 30, and the engagement/disengagement of the lockup clutch 2a are performed.

Figure 3:
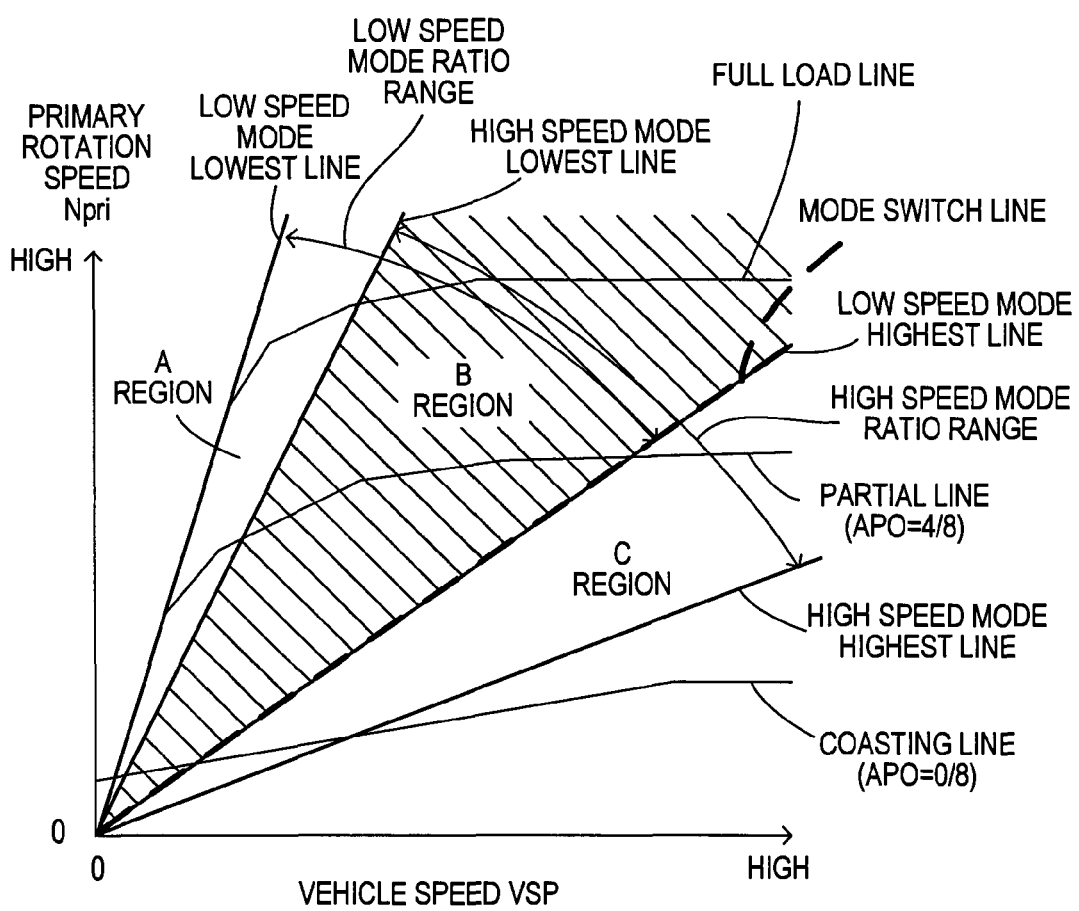
FIG. 3 is a view showing an example of a shift map.

FIG. 3 shows an example of the shift map stored in the memory device 122. The transmission controller 12 controls the variator 20 and the subtransmission mechanism 30 in accordance with operating conditions of the vehicle (in this embodiment, the vehicle speed VSP, the primary rotation speed Npri, and the accelerator opening APO) while referring to the shift map.

On the shift map, operating points of the transmission 4 are defined by the vehicle speed VSP and the primary rotation speed Npri. An incline of a line linking the operating point of the transmission 4 and a zero point in a lower left corner of the shift map corresponds to the speed ratio of the transmission 4 (an overall speed ratio obtained by multiplying the speed ratio of the subtransmission mechanism 30 by the speed ratio of the variator 20; to be referred to hereafter as a "through speed ratio"). On this shift map, similarly to a shift map of a conventional belt continuously variable transmission, a shift line is set for each accelerator opening APO, and a shift is performed in the transmission 4 in accordance with a shift line selected according to the accelerator opening APO. For the sake of simplicity, FIG. 3 shows only a full load line (a shift line when the accelerator opening APO=8/8), a partial line (a shift line when the accelerator opening APO=4/8), and a coasting line (a shift line when the accelerator opening APO=0/8).

When the transmission 4 is in the low speed mode, the transmission 4 can be shifted between a low speed mode Lowest line obtained by setting the speed ratio of the variator 20 at the Lowest speed ratio and a low speed mode Highest line obtained by setting the speed ratio of the variator 20 at the Highest speed ratio. Namely, in the low speed mode, the operating point of the transmission 4 moves within an A region and a B region in the figure. When the transmission 4 is in the high speed mode, on the other hand, the transmission 4 can be shifted between a high speed mode Lowest line obtained by setting the speed ratio of the variator 20 at the Lowest speed ratio and a high speed mode Highest line obtained by setting the speed ratio of the variator 20 at the Highest speed ratio. Namely, in the high speed mode, the operating point of the transmission 4 moves within the B region and a C region in the figure.

The speed ratio in each gear position of the subtransmission mechanism 30 is set such that the speed ratio corresponding to the low speed mode Highest line (the low speed mode Highest speed ratio) is smaller than the speed ratio corresponding to the high speed mode Lowest line (the high speed mode Lowest speed ratio). In so doing, a through speed ratio range of the transmission 4 that can be realized in the low speed mode (referred to as a "low speed mode ratio range" in the figure) partially overlaps a through speed ratio range of the transmission 4 that can be realized in the high speed mode (referred to as a "high speed mode ratio range" in the figure), and therefore, when the operating point of the transmission 4 is in the B region sandwiched between the high speed mode Lowest line and the low speed mode Highest line, the transmission 4 can select either the low speed mode or the high speed mode.

Furthermore, a mode switch line at which the subtransmission mechanism 30 performs a shift is set on the shift map to overlap the low speed mode Highest line. The through speed ratio corresponding to the mode switch line (to be referred to hereafter as a "mode switch speed ratio mRatio") is set at an equal value to the low speed mode Highest speed ratio. The reason for setting the mode switch line in this manner is because an input torque input into the subtransmission mechanism 30 decreases as the speed ratio of the variator 20 decreases and thus shift shock during a shift in the subtransmission mechanism 30 can be suppressed.

When the operating point of the transmission 4 crosses the mode switch line, or in other words when an actual value of the through speed ratio (to be referred to hereafter as an "actual through speed ratio Ratio") passes the mode switch speed ratio mRatio, the transmission controller 12 performs a mode switch shift. Hereinafter, "the operation point of the transmission 4 crosses the mode switch line" is expressed as "the through speed ratio of the transmission 4 passes the mode switch line".

In the mode switch shift, the transmission controller 12 performs a shift in the subtransmission mechanism 30 and varies the speed ratio of the variator 20 in an opposite direction to a variation direction of the speed ratio of the subtransmission mechanism 30. The reason for causing the speed ratio of the variator 20 to vary in the opposite direction to the speed ratio variation direction of the subtransmission mechanism 30 during a mode switch shift is to ensure that a driver does not experience an unpleasant feeling due to input rotation variation caused by a step in the actual through speed ratio Ratio.

More specifically, when the actual through speed ratio Ratio of the transmission 4 passes the mode switch line (the mode switch speed ratio mRatio) from the Low side to the High side, the transmission controller 12 changes the gear position of the subtransmission mechanism 30 from the first speed to the second speed (a 1-2 shift) and varies the speed ratio of the variator 20 to the Low side.

Conversely, when the actual through speed ratio Ratio of the transmission 4 passes the mode switch line (the mode switch speed ratio mRatio) from the High side to the Low side, the transmission controller 12 changes the gear position of the subtransmission mechanism 30 from the second speed to the first speed (a 2-1 shift) and varies the speed ratio of the variator 20 to the High side.

However, that when the mode switch shift is performed using only the mode switch speed ratio mRatio as a threshold, shifts are performed in the subtransmission mechanism 30 frequently in a case where the actual through speed ratio Ratio varies in the vicinity of the mode switch speed ratio mRatio, and as a result, shift shock may occur repeatedly, leading to a reduction in drivability and a reduction in the durability of frictional engagement elements (the low brake 32, the High clutch 33, and the Rev brake 34) constituting the subtransmission mechanism 30.

Therefore, the transmission controller 12 allows a 2-1 shift to be performed in the subtransmission mechanism 30 only in a situation where a large driving force, for example a driving force that cannot be achieved by keeping the gear position of the subtransmission mechanism 30 at the second speed, is required, such as a situation in which the accelerator pedal is depressed sharply, thereby reducing a shift frequency of the subtransmission mechanism 30.

When 2-1 shifts are not permitted in the subtransmission mechanism 30, the transmission 4 is shifted by shifting the variator 20 alone. In this case, when the speed ratio of the variator 20 reaches the Lowest speed ratio, the transmission 4 cannot be downshifted further, and therefore the driving force may be insufficient. Hence, when the speed ratio of the variator 20 remains at the Lowest speed ratio for a predetermined time or more, the transmission controller 12 disengages the lockup clutch 2a such that the driving force is increased using a torque amplification action of the torque converter 2.

Figure 4:
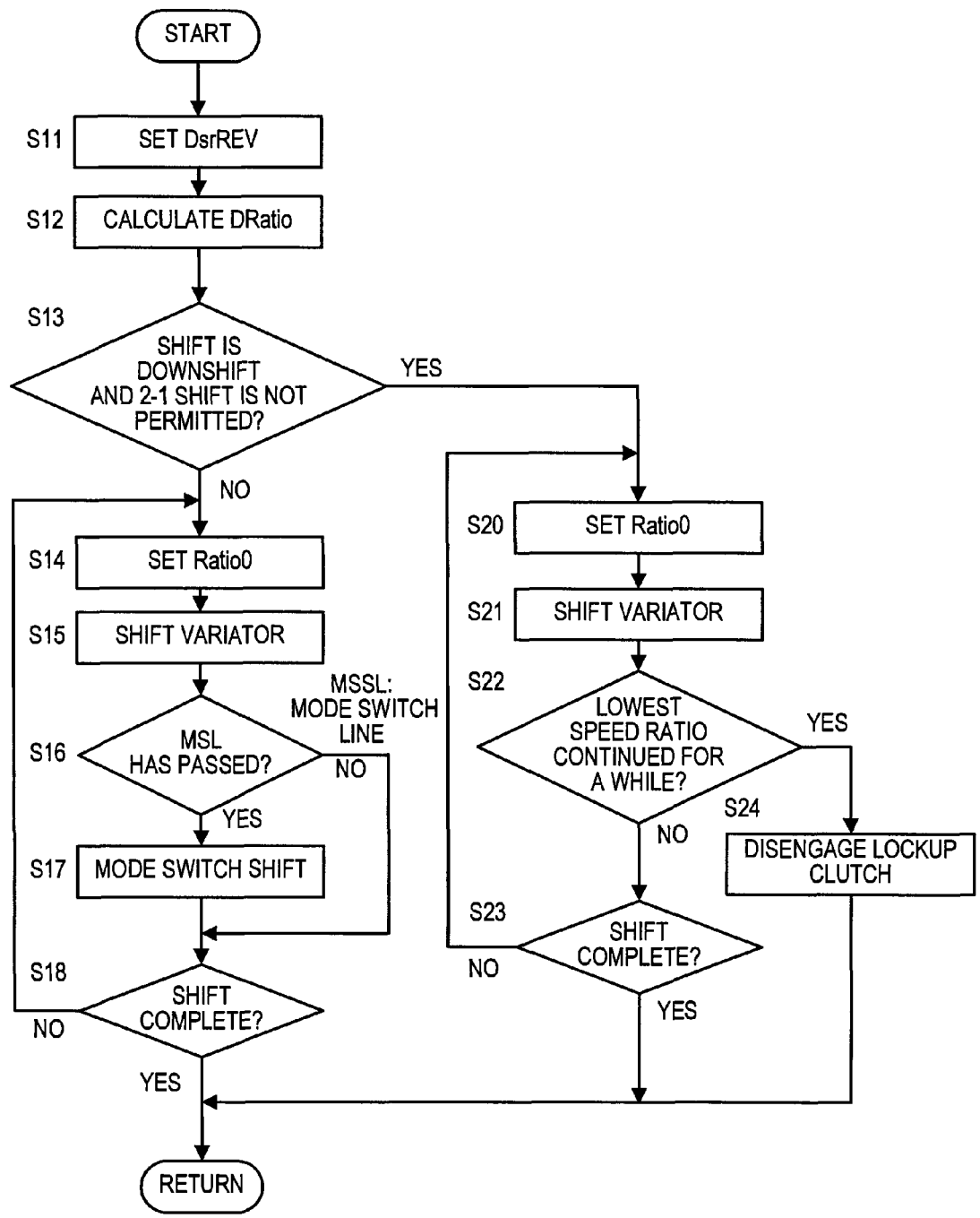
FIG. 4 is a flowchart showing the content of a shift control program executed by the transmission controller.

FIG. 4 shows an example of the shift control program stored in the memory device 122 of the transmission controller 12. The specific content of the shift control executed by the transmission controller 12 will now be described with reference to FIG. 4.

In S11, the transmission controller 12 searches the shift map shown in FIG. 3 for a value corresponding to the current vehicle speed VSP and accelerator opening APO, and sets this value as a destination primary rotation speed DsrREV. The destination primary rotation speed DsrREV is a primary rotation speed to be reached at the current vehicle speed VSP and accelerator opening APO, and serves as a steady-state target value of the primary rotation speed.

In S12, the transmission controller 12 calculates a destination through speed ratio DRatio by dividing the destination primary rotation speed DsrREV by the vehicle speed VSP and a final reduction ratio fRatio of the final reduction gear 6. The destination through speed ratio DRatio is a through speed ratio to be reached at the current vehicle speed VSP and accelerator opening APO, and serves as a steady-state target value of the through speed ratio.

In S13, the transmission controller 12 determines whether or not the shift in the transmission 4 is a downshift and whether or not a 2-1 shift is permitted in the subtransmission mechanism 30.

It is possible to determine whether or not the shift in the transmission 4 is a downshift by comparing the destination through speed ratio DRatio with an actual through speed ratio Ratio. The actual through speed ratio Ratio is calculated whenever required on the basis of the current vehicle speed VSP and primary rotation speed Npri (likewise hereafter). When the destination through speed ratio DRatio is larger than the actual through speed ratio Ratio, the transmission controller 12 determines that the shift in the transmission 4 is a downshift, and when the destination through speed ratio DRatio is equal to or smaller than the actual through speed ratio Ratio, the transmission controller 12 determines that the shift is an upshift.

Further, the transmission controller 12 determines whether or not a 2-1 shift is permitted in the subtransmission mechanism 30 on the basis of the accelerator opening APO, the vehicle speed VSP, and the destination through speed ratio DRatio. The transmission controller 12 permits a 2-1 shift in the subtransmission mechanism 30 only when a large driving force that cannot be achieved by keeping the gear position of the subtransmission mechanism 30 at the second speed is required.

Figure 5:
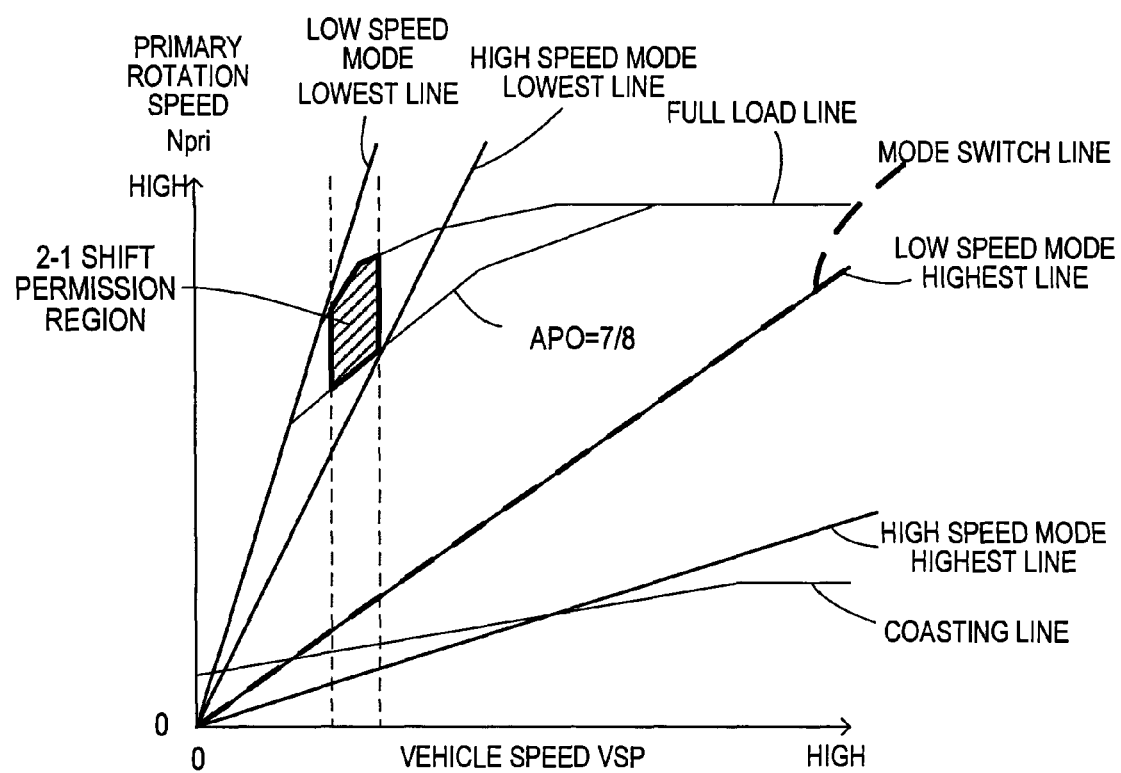
FIG. 5 is a view illustrating a 2-1 shift permission region of a subtransmission mechanism.

More specifically, as shown in FIG. 5, for example, a region (to be referred to hereafter as a "2-1 shift permission region") in which a 2-1 shift is permitted in the subtransmission mechanism 30 is set in advance on the shift map. When an operating point of the transmission 4 determined by the accelerator opening APO and the vehicle speed VSP is in the 2-1 shift permission region and a variation speed of the accelerator opening APO exceeds a predetermined rapid depression determination value, a 2-1 shift is permitted in the subtransmission mechanism 30. It should be noted that the operating point here is not an actual operating point but an operating point reached once the shift in the transmission 4 is complete. Further, an incline of a line linking the operating point and a zero point in a lower left corner of the shift map corresponds to the destination through speed ratio DRatio.

In the example shown in FIG. 5, the 2-1 shift permission region is set between a predetermined high load shift line and a full load line (for example, a high load region in which APO=7/8 to 8/8) and in a predetermined vehicle speed range (for example, a medium vehicle speed region of 30 km/h to 45 km/h).

Further, the 2-1 shift permission region is disposed on a Low side (the upper left side of the figure) of a high speed mode Lowest line. In other words, a 2-1 shift is permitted in the subtransmission mechanism 30 when the destination through speed ratio DRatio is larger than the high speed mode Lowest speed ratio. The reason for this is that when the destination through speed ratio DRatio is smaller than the high speed mode Lowest speed ratio, the destination through speed ratio DRatio can be achieved, or in other words the required driving force can be generated, by shifting the variator 20 alone, i.e. without performing a 2-1 shift in the subtransmission mechanism 30.

It should be noted that the 2-1 shift permission condition described here is merely an example, and the condition is not limited thereto. For example, when the oil temperature of the transmission 4 is low, an increase in the oil temperature TMP may be promoted by permitting a 2-1 shift in the subtransmission mechanism 30 and performing the 2-1 shift actively, thereby keeping the primary rotation speed Npri high.

On the other hand, when the operating point of the transmission 4 determined by the accelerator opening APO and the vehicle speed VSP is outside of the region or when the variation speed of the accelerator opening APO does not exceed the predetermined rapid depression determination value, a large driving force is not required, and therefore the transmission controller 12 does not permit a 2-1 shift in the subtransmission mechanism 30.

When it is determined in S13 that the shift in the transmission 4 is a downshift and that a 2-1 shift is not permitted in the subtransmission mechanism 30, the processing advances to S20. In all other cases, the processing advances to S14.

In S14, the transmission controller 12 sets a target through speed ratio Ratio0 for varying the actual through speed ratio Ratio from the value thereof at the start of the shift to the destination through speed ratio DRatio at a predetermined transient response. The target through speed ratio Ratio0 is a transient target value of the through speed ratio. The predetermined transient response is a first order lag response, for example, which is set such that the target through speed ratio Ratio0 gradually approaches the destination through speed ratio DRatio.

In S15, the transmission controller 12 controls the actual through speed ratio Ratio to the target through speed ratio Ratio0. More specifically, the transmission controller 12 calculates a target speed ratio vRatio0 of the variator 20 by dividing the target through speed ratio Ratio0 by the speed ratio of the subtransmission mechanism 30, and controls the variator 20 such that an actual speed ratio vRatio of the variator 20 becomes the target speed ratio vRatio0. As a result, the actual through speed ratio Ratio follows the destination through speed ratio DRatio at the predetermined transient response.

In S16, the transmission controller 12 determines whether or not the actual through speed ratio Ratio has passed the mode switch line (the mode switch speed ratio mRatio). When an affirmative determination is made, the processing advances to S17, and when a negative determination is made, the processing advances to S18.

In S17, the transmission controller 12 performs a mode switch shift. In the mode switch shift, the transmission controller 12 performs a shift in the subtransmission mechanism 30 (when the current gear position is the first speed, a 1-2 shift and when the current gear position is the second speed, a 2-1 shift), and varies the actual speed ratio vRatio of the variator 20 in the opposite direction to the speed ratio variation direction of the subtransmission mechanism 30 to ensure that a step does not occur in the actual through speed ratio Ratio on either side of the mode switch shift.

In S18, the transmission controller 12 determines whether or not the shift is complete. More specifically, the transmission controller 12 determines that the shift is complete when a deviation between the actual through speed ratio Ratio and the destination through speed ratio DRatio is smaller than a predetermined value. When it is determined that the shift is complete, the processing is terminated, and when it is determined that the shift is not complete, the processing of S14 to S18 is repeated until it is determined that the shift is complete.

Meanwhile, when the processing advances to S20, the transmission controller 12 calculates the target through speed ratio Ratio0 on the basis of the destination through speed ratio DRatio and controls the variator 20 on the basis thereof in S20 and S21, similarly to S14 and S15. However, since a 2-1 shift is not permitted in the subtransmission mechanism 30, the transmission controller 12 does not determine whether or not the actual speed ratio Ratio of the transmission 4 has passed the mode switch line, as in S16, and performs a shift in the variator 20 alone even if the actual speed ratio Ratio of the transmission 4 has passed the mode switch line.

When the destination through speed ratio DRatio is set outside of the high speed mode ratio range, a 2-1 shift is not permitted in the subtransmission mechanism 30, and therefore the shift in the transmission 4 is halted at the point where the speed ratio of the variator 20 reaches the Lowest speed ratio. In this case, the transmission 4 cannot be downshifted further, and therefore the driving force may be insufficient.

Hence, in S22, the transmission controller 12 determines whether or not a state in which the actual speed ratio vRatio of the variator 20 corresponds to the Lowest speed ratio has continued for a predetermined time or more. When it is determined that this state has continued for the predetermined time or more, the transmission controller 12 disengages the lockup clutch 2a in S24 such that the driving force is increased by the torque amplification action of the torque converter 2.

In S23, similarly to S18, the transmission controller 12 determines whether or not the shift is complete. When the shift is determined to be complete, the processing is terminated, and when the shift is not complete, the processing of S20 to S22 is repeated.

Next, actions and effects of the above shift control will be described.

According to the shift control described above, a 1-2 shift and a 2-1 shift are both performed in the subtransmission mechanism 30 when the actual through speed ratio Ratio passes the mode switch line (the mode switch speed ratio mRatio) (S17).

However, a 2-1 shift is permitted in the subtransmission mechanism 30 only in a situation where a large driving force is required, such as when the accelerator pedal is depressed sharply (FIG. 5), and therefore the frequency with which a 2-1 shift follows a 1-2 shift is reduced. As a result, problems occurring when shifts are performed repeatedly in the subtransmission mechanism 30, such as a reduction in drivability due to repeated occurrence of shift shock and a reduction in the durability of the frictional engagement elements (the Low brake 32, High clutch 33, and Rev brake 34) constituting the subtransmission mechanism 30 can be prevented.

Further, according to the shift control described above, the determination as to whether driving force is required is made taking into consideration not only the magnitude of the accelerator opening APO but also the variation speed thereof, the vehicle speed VSP, and the destination through speed ratio DRatio. Thus, the determination as to whether driving force is required can be made appropriately.

Furthermore, when a 2-1 shift is not permitted in the subtransmission mechanism 30, the transmission 4 is downshifted by shifting the variator 20 alone such that further downshifts become impossible at the point where the speed ratio of the variator 20 reaches the Lowest speed ratio, and as a result, the driving force may be insufficient. According to the shift control described above, however, the lockup clutch 2a is disengaged when this state has continued for a predetermined time (S22→S24) so that the driving force can be increased by the torque amplification action of the torque converter 2, and therefore a driving force deficiency can be prevented.

It should be noted that the reason for using a continuous predetermined time as a condition is that a driving force deficiency becomes steadily more likely to occur as the state in which downshifts cannot be performed continues. By disengaging the lockup clutch 2a on this condition, the driving force can be increased at a more appropriate timing.

An embodiment of this invention was described above, but this embodiment is merely one example of application of this invention, and the technical scope of this invention is not limited to the specific constitutions of the embodiment.

For example, in the above embodiment, the mode switch line is set to overlap the low speed mode Highest line, but the mode switch line may be set to overlap the high speed mode Lowest line or set between the high speed mode Lowest line and the low speed mode Highest line. The mode switch line may be comprised of polygonal line similar to a shift line for a conventional step automatic transmission.

Further, in the above embodiment, the subtransmission mechanism 30 is a speed change mechanism having the first speed and second speed gear positions as forward gear positions, but the subtransmission mechanism 30 may be a speed change mechanism having three or more gear positions as forward gear positions.

Furthermore, the subtransmission mechanism 30 is formed using a Ravigneaux planetary gear mechanism, but is not limited to this constitution. For example, the subtransmission mechanism 30 may be constituted by a combination of a normal planetary gear mechanism and frictional engagement elements, or by a plurality of power transmission paths formed from a plurality of gear trains having different speed ratios, and frictional engagement elements for switching the power transmission paths.

Further, the V belt 23 may be comprised of a metal ring and a plurality of metal elements, but the V belt 23 may be comprised of an endless chain. The term "belt" in claims covers various types of belt which can be used for transmitting rotation between pulleys in a continuously variable transmission.

Further, the hydraulic cylinders 23a, 23b are provided as actuators for displacing the movable conical plates of the pulleys 21, 22 in the axial direction, but the actuators may be driven electrically rather than hydraulically.

Further, in the above embodiment, the power source is comprised of the engine 1, but an electric motor or a combination of an engine and an electric motor may be used as the power source.

This application claims priority based on Japanese Patent Application No. 2009-79677, filed with the Japan Patent Office on Mar. 27, 2009, the entire content of which is incorporated into this specification.

What is claimed is:

1. A continuously variable transmission installed in a vehicle, which shifts an output rotation of a power source and transmits the shifted rotation to drive wheels, comprising:
a variator capable of varying a speed ratio continuously;
a subtransmission mechanism provided in series with the variator and having a first gear position and a second gear position, the second gear position having a smaller speed ratio than the first gear position, as forward gear positions; and
a shift control unit which shifts speed ratios of the variator and the subtransmission mechanism in accordance with an operating condition,
wherein the shift control unit changes the gear position of the subtransmission mechanism from the first gear position to the second gear position based on a relationship between an operating condition and a mode switch line on a shift map for the continuously variable transmission defined by a primary rotation speed of the variator and a vehicle speed when the gear position of the subtransmission mechanism is at the first gear position, and
wherein the shift control unit changes the gear position of the subtransmission mechanism from the second gear position to the first gear position regardless of the relationship between the operating condition and the mode switch line if an accelerator pedal is depressed to or above a predetermined opening when the gear position of the subtransmission mechanism is at the second gear position.

2. The continuously variable transmission as defined in claim 1, wherein
the shift control unit changes the gear position of the subtransmission mechanism from the second gear position to the first gear position if the accelerator pedal is depressed to or above the predetermined opening and a variation speed of the opening of the accelerator pedal equals or exceeds a predetermined speed when the gear position of the subtransmission mechanism is at the second gear position.

3. The continuously variable transmission as defined in claim 1, wherein
the shift control unit changes the gear position of the subtransmission mechanism from the second gear position to the first gear position if the accelerator pedal is depressed to or above the predetermined opening and a vehicle speed is within a predetermined range when the gear position of the subtransmission mechanism is at the second gear position.

4. The continuously variable transmission as defined in claim 1, wherein
the shift control unit changes the gear position of the subtransmission mechanism from the second gear position to the first gear position if the accelerator pedal is depressed to or above the predetermined opening and a through speed ratio which is an overall speed ratio of the variator and the subtransmission mechanism is larger than a high speed mode Lowest speed ratio which is the through speed ratio when the speed ratio of the variator is the Lowest speed ratio and the gear position of the subtransmission mechanism is at the second gear position.

5. The continuously variable transmission as defined in claim 1, further comprising a torque converter having a lockup clutch, which is disposed on an input side of the continuously variable transmission, wherein
the shift control unit disengages the lockup clutch when the speed ratio of the variator has reached the Lowest speed ratio while the gear position of the subtransmission mechanism is not changed from the second gear position to the first gear position.

6. The continuously variable transmission as defined in claim 5, wherein
the shift control unit disengages the lockup clutch if a state in which the speed ratio of the variator has reached the Lowest speed ratio has continued for a predetermined time while the gear position of the subtransmission mechanism is not changed from the second gear position to the first gear position.

7. A control method for a continuously variable transmission that is installed in a vehicle so as to shift an output rotation of a power source and transmit the shifted rotation to drive wheels, including a variator capable of varying a speed ratio continuously, and a subtransmission mechanism provided in series with the variator and having a first gear position and a second gear position, the second gear position having a smaller speed ratio than the first gear position, as forward gear positions, the method comprising:
shifting the variator and the subtransmission mechanism in accordance with an operating condition; and
changing a gear position of the subtransmission mechanism from the first gear position to the second gear position based on a relationship between the operating condition and a mode switch line on a shift map for the continuously variable transmission defined by a primary rotation speed of the variator and a vehicle speed when the gear position of the subtransmission mechanism is at the first gear position, and
changing of the gear position of the subtransmission mechanism from the second gear position to the first gear position regardless of the relationship between the operating condition and the mode switch line if an accelerator pedal is depressed to or above a predetermined opening when the gear position of the subtransmission mechanism is at the second gear position.

8. A continuously variable transmission installed in a vehicle, which shifts an output rotation of a power source and transmits the shifted rotation to drive wheels, comprising:
a variator capable of varying a speed ratio continuously;
a subtransmission mechanism provided in series with the variator and having a first gear position and a second gear position, the second gear position having a smaller speed ratio than the first gear position, as forward gear positions;
a destination through speed ratio setting unit which sets, based on an operating condition of the vehicle, a through speed ratio which is an overall speed ratio of the variator and the subtransmission mechanism to be realized in accordance with the operating condition as a destination through speed ratio;
a shift control unit which controls at least one of the speed ratio of the variator and the gear position of the subtransmission mechanism such that an actual through speed ratio, which is an actual value of the through speed ratio, follows the destination through speed ratio with a predetermined transitional response; and a subtransmission mechanism 2-1 shift permitting unit which permits a 2-1 shift, in which the gear position of the subtransmission mechanism is changed from the second gear position to the first gear position, only if an accelerator pedal of the power source is depressed to or above a predetermined opening, and the destination through speed ratio is larger than a high speed mode Lowest speed ratio which is the through speed ratio when the speed ratio of the variator is the Lowest speed ratio and the gear position of the subtransmission mechanism is at the second gear position, wherein the shift control unit changes the gear position of the subtransmission mechanism from the first gear position to the second gear position when the actual through speed ratio passes a mode switch speed ratio from a Low side to a High side, and changes the gear position of the subtransmission mechanism from the second gear position to the first gear position when the actual through speed ratio passes the mode switch speed ratio from the High side to the Low side only if the 2-1 shift is permitted in the subtransmission mechanism.

* * * * *